US009017205B2

(12) United States Patent
Steinwender (10) Patent No.: US 9,017,205 B2
(45) Date of Patent: Apr. 28, 2015

(54) TRANSMISSION UNIT (75) Inventor: Herbert Steinwender, Haselsdorf-Tobelbad (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 103 days.

(21) Appl. No.: 13/997,267

(22) PCT Filed: Dec. 15, 2011

(86) PCT No.: PCT/EP2011/072910
§ 371 (c)(1),
(2), (4) Date: Jun. 23, 2013

(87) PCT Pub. No.: WO2012/084684
PCT Pub. Date: Jun. 28, 2012

(65) Prior Publication Data
US 2013/0274048 A1    Oct. 17, 2013

(30) Foreign Application Priority Data
Dec. 23, 2010    (DE) .......................... 10 2010 056 106

(51) Int. Cl.
F16H 47/06    (2006.01)
F16H 47/04    (2006.01)
F16D 31/04    (2006.01)
F04C 2/14    (2006.01)
F04C 15/00    (2006.01)
F16H 3/72    (2006.01)

(52) U.S. Cl.
CPC ................ *F16H 47/04* (2013.01); *F16D 31/04* (2013.01); *F04C 2/14* (2013.01); *F04C 15/0057* (2013.01); *F16H 3/722* (2013.01)

(58) Field of Classification Search
CPC .... F16H 2047/045; F16H 3/722; F16D 31/04
USPC .......... 475/93, 98, 99, 102; 418/10, 204, 196; 251/249
See application file for complete search history.

(56) References Cited

U.S. PATENT DOCUMENTS 2,656,736 A  * 10/1953  Ebsworth ...................... 475/102
3,724,975 A     4/1973  Bschorer
6,030,196 A  *  2/2000  Coeuret et al. ................ 418/165

FOREIGN PATENT DOCUMENTS

GB             465363 A       5/1937
WO    WO 2009030712 A2 *    3/2009
WO    WO 2011111376 A1 *    9/2011

* cited by examiner

*Primary Examiner* — Ramya Burgess
*Assistant Examiner* — Lillian Nguyen
(74) *Attorney, Agent, or Firm* — Jordan IP Law, LLC; Todd A. Vaughn (57) ABSTRACT A transmission unit comprises a planetary wheel set, which comprises a plurality of gearwheel elements and is designed as a pump which effects delivery of hydraulic fluid from a suction zone to a pressure zone of a pump casing containing the planetary wheel set by means of the gearwheel elements. A controllable throttling device is provided in order to selectively throttle a fluid flow pumped between the suction zone and the pressure zone and thereby to brake the gearwheel elements of the planetary wheel set relative to one another. A fluid reservoir, which can be connected simultaneously to the suction zone and to the pressure zone via the throttling device, is arranged in a pump casing interspace formed between a plurality of gearwheel elements of the planetary wheel set.

14 Claims, 10 Drawing Sheets

PRIOR ART

TRANSMISSION UNIT

CROSS-REFERENCE TO RELATED APPLICATIONS

The present application is a National Stage Application of PCT International Application No. PCT/EP2011/072910 (filed on Dec. 15, 2011), under 35 U.S.C. §371, which claims priority to German Patent Application No. DE 10 2010 056 106.1 (filed on Dec. 23, 2010), which are each hereby incorporated by reference in their respective entireties.

TECHNICAL FIELD

The present invention relates to a transmission unit having a planetary wheel set, which comprises a plurality of gearwheel elements and is designed as a pump which effects delivery of hydraulic fluid from a suction zone to a pressure zone of a pump casing containing the planetary wheel set by means of the gearwheel elements, wherein a controllable throttling device is provided in order to selectively throttle a fluid flow pumped between the suction zone and the pressure zone and thereby to brake the gearwheel elements of the planetary wheel set relative to one another.

BACKGROUND

A transmission unit of this kind can be used in various applications in order to provide two different transmission ratios, between which it is possible to switch by controlling the throttling device. By completely shutting off the throttling device, for example, it is possible to block the pump and hence to set the planetary wheel set to rotate as a unit. By opening the throttling device, circulation of the hydraulic fluid between the suction zone and the pressure zone can be enabled, thereby decoupling the corresponding gearwheel elements of the planetary wheel set from one another, apart from the flow resistance.

The throttling device can be a valve arranged in the vicinity of the pump casing. In order to connect the suction zone and the pressure zone of the pump to the throttling device, suitable suction and discharge lines can be provided. In such arrangements, however, the required installation space for the transmission unit is increased. Moreover, depending on length and line cross section, the suction and discharge lines cause a relatively high flow resistance with consequent losses of power.

U.S. Pat. No. 3,724,975 and Great Britain Patent No. 465,363 disclose rotary piston pumps which contain gearwheel elements for pumping hydraulic fluid from a suction zone to a pressure zone of a pump casing containing the planetary wheel set (22), and provide a controllable throttling device in order to selectively throttle a fluid flow pumped between the suction zone and the pressure zone.

SUMMARY

It is therefore an object of the invention to improve the efficiency of and reduce the required installation space for a transmission unit of the abovementioned type.

The object is achieved by a transmission unit having a planetary wheel set, which comprises a plurality of gearwheel elements and is designed as a pump which effects delivery of hydraulic fluid from a suction zone to a pressure zone of a pump casing containing the planetary wheel set by means of the gearwheel elements, wherein a controllable throttling device is provided in order to selectively throttle a fluid flow pumped between the suction zone and the pressure zone and thereby to brake the gearwheel elements of the planetary wheel set relative to one another, characterized in that a fluid reservoir, which can be connected simultaneously to the suction zone and to the pressure zone via the throttling device, is arranged in a pump casing interspace formed between a plurality of gearwheel elements of the planetary wheel set.

In accordance with the invention, a fluid reservoir, which can be connected simultaneously to the suction zone and to the pressure zone via the throttling device, is arranged in a pump casing interspace formed between a plurality of gearwheel elements of the planetary wheel set. In other words, a region of the planetary wheel set which is not normally used is used to accommodate a fluid reservoir. The fluid reservoir is thus to a certain extent integrated into the planetary wheel set itself, for which reason the required installation space can be reduced as compared with a transmission unit that has a fluid reservoir arranged outside the planetary wheel set. By virtue of the fact that the fluid reservoir can be connected to the suction zone and the pressure zone—which are likewise arranged within the planetary wheel set—the flow paths obtained are particularly short, thereby enabling the flow resistance to be minimized. The invention thus provides a transmission unit based on a planetary wheel set designed as a pump which has improved efficiency and requires less installation space as compared with known arrangements.

Developments of the invention are indicated in the dependent claims, the description and the attached drawing.

In accordance with one embodiment of the invention, the throttling device is integrated into the fluid reservoir. As a result, the required installation space can be reduced as compared with a transmission unit having a throttling device arranged outside the planetary wheel set.

The fluid reservoir can be arranged between a sun wheel, an annulus and two adjacent planet wheels of the planetary wheel set. In particular, the fluid reservoir can be arranged in a radial direction between the sun wheel and the annulus and in a circumferential direction between two adjacent planet wheels of the planetary wheel set, relative to the axis of rotation of the planetary wheel set. This interspace offers sufficient room to accommodate a fluid reservoir.

The fluid reservoir can be integrated into a planet carrier of the planetary wheel set. For example, an arm of the planet carrier, which projects into each of the interspaces between the sun wheel, the annulus and adjacent planet wheels, can be converted into a fluid reservoir. For this purpose, a cavity can be provided within the arm, said cavity being connected by suitable openings or passages to the suction zone and to the pressure zone. This results in a particularly simple design.

Respective fluid reservoirs are preferably provided in each interspace formed between two adjacent planet wheels of the planetary wheel set. In this way, the circulation of the hydraulic fluid in the interspaces can take place over the shortest possible distance in each case.

In accordance with another embodiment of the invention, the throttling device comprises a valve, the action of which is dependent on centrifugal force. By means of a valve of this kind, it is possible to provide purely passive control of the throttling device. This allows a construction of particularly simple design and low-cost production of the transmission unit. In particular, no complex control lines, control units and the like have to be provided. Instead, the valve operates in accordance with a speed of a drive element. By way of example, the valve operating in a manner dependent on centrifugal force can be designed to interrupt the delivery flow of the pump as soon as the speed of an input element exceeds a predetermined threshold.

The valve can comprise a rotatable shutoff element, which can be latched in a first and in a second end position. A rotatable shutoff element can be arranged in the interspace of the pump casing, minimizing the installation space. Latching can serve, in particular, to bring about a relatively abrupt initiation of the movement of the shutoff element at a predetermined level of the centrifugal force. To set the level of force which triggers the movement, it is possible, in particular, to provide spring latching elements in the associated valve seat, said elements engaging in corresponding recesses in the shutoff element or vice versa. Thus, the shutoff element can only move when the spring force is overcome. In this way, particularly rapid and reliable opening and closing of the valve can be made possible. Moreover, a hysteresis effect can be provided, preventing unwanted repeated switching over of the transmission unit in the region of the transitional speed.

The shutoff element can be mounted eccentrically in a valve body of the valve. Eccentric mounting is taken to mean mounting where the mass of the shutoff element is distributed nonuniformly in relation to the axis of rotation. Such eccentric mounting can bring about automatic initiation of a rotary motion of the shutoff element when a centrifugal force acts on the planet carrier, for example.

In accordance with one embodiment, the shutoff element is preloaded into an open position. The preloading ensures that the shutoff element always allows the delivery flow of the pump at a low centrifugal force, that is to say, for example, at a low speed of the planet carrier, and interrupts said flow only at a relatively high centrifugal force. The degree of preloading here can be matched to the respective application.

It is possible for a plurality of valves having rotatable shutoff elements to be provided, wherein the shutoff elements are coupled to one another by a synchronizer ring. A synchronizer ring of this kind can ensure simultaneous switching of all the valves.

The synchronizer ring can preload the shutoff elements jointly into an open position by means of a spring device. This allows a simple design since it is not necessary to provide a dedicated spring device for each shutoff element.

The synchronizer ring is preferably a punched sheet-metal part. This allows particularly simple and low-cost production.

Toothing which interacts with toothing on each of the shutoff elements can be provided on the synchronizer ring. By rotating the synchronizer ring about the axis of rotation of the planetary wheel set, it is thus possible to bring about joint rotation of all the shutoff elements about the respective axes of rotation thereof.

The invention furthermore relates to a driving device for an auxiliary unit of an engine, having a shaft and a belt pulley, which serve as an input element and an output element, and having a transmission unit of the type described above, which acts to adapt the speed of the shaft relative to the belt pulley, wherein a first operating state of the transmission unit, in which a transmission ratio substantially of one between the shaft and the belt pulley is set, can be set by actuating the throttling device, and wherein the transmission unit furthermore comprises a controllable brake for selectively fixing one of the gearwheel elements of the planetary wheel set, wherein a second operating state of the transmission unit, in which a transmission ratio unequal to one between the shaft and the belt pulley is set, can be set by actuating the brake.

The term "transmission ratio of one" (i=1) is intended to mean a theoretical value, it being necessary to take into account that, in practice, there are always leakage losses, leading to a certain rotation of the gearwheel elements relative to one another and thus to a deviation from the ideal value. In particular, the planetary wheel set of the transmission unit can be arranged in the torque transmission path between the input element and the output element. A device of this kind can be used to transmit a torque from an internal combustion engine to one or more auxiliary units of the internal combustion engine, e.g., a generator, a power steering pump, an air-conditioning compressor and/or a water pump.

Thus, the shaft of the driving device can be the crankshaft of the internal combustion engine, or the shaft of the driving device can be coupled to the crankshaft of the internal combustion engine so as to have a driving effect. As an alternative or in addition to said internal combustion engine, the shaft of the driving device can be coupled to an electric motor serving as the drive shaft of the vehicle. The torque is transmitted to an auxiliary unit via the belt pulley and a poly-V belt, which drives a corresponding input belt pulley of the auxiliary unit. The switchable transmission unit makes it possible to raise the speed of the auxiliary unit when required in order, in this way, to make better use of the capacity of the auxiliary unit. At low engine speed, for example, a speed increase can be set, and direct drive from the crankshaft to the auxiliary unit without a speed increase can be set at a high engine speed. In this way, a correspondingly smaller auxiliary unit can be used to meet the capacity requirements. By using smaller auxiliary units, it is possible to save on costs and to lower fuel consumption figures.

As an alternative, it is also possible to mount the driving device on an auxiliary unit of an internal combustion engine, wherein, in this case, said shaft is formed by the drive shaft of the auxiliary unit or is connected to the latter in order to exert a driving effect. In this configuration, torque transmission is not from the shaft to the belt pulley but in the reverse direction from the belt pulley to the shaft. The belt pulley accordingly forms the input element and the shaft forms the output element. To increase the speed of the auxiliary unit relative to the crankshaft of the internal combustion engine, there must be a speed increase between the belt pulley and the shaft in this case.

The pressure zone is preferably connected to a control piston for hydraulic actuation of the brake. As soon as the pressure rises, hydraulic actuation of the brake takes place. The control piston is thus actuated by the load-dependent fluid pressure in the pressure zone, for which reason there is no need to provide a separate system for activating the brake.

DRAWINGS

The invention is described by way of example below with reference to the drawing.

DESCRIPTION

Figure 1:
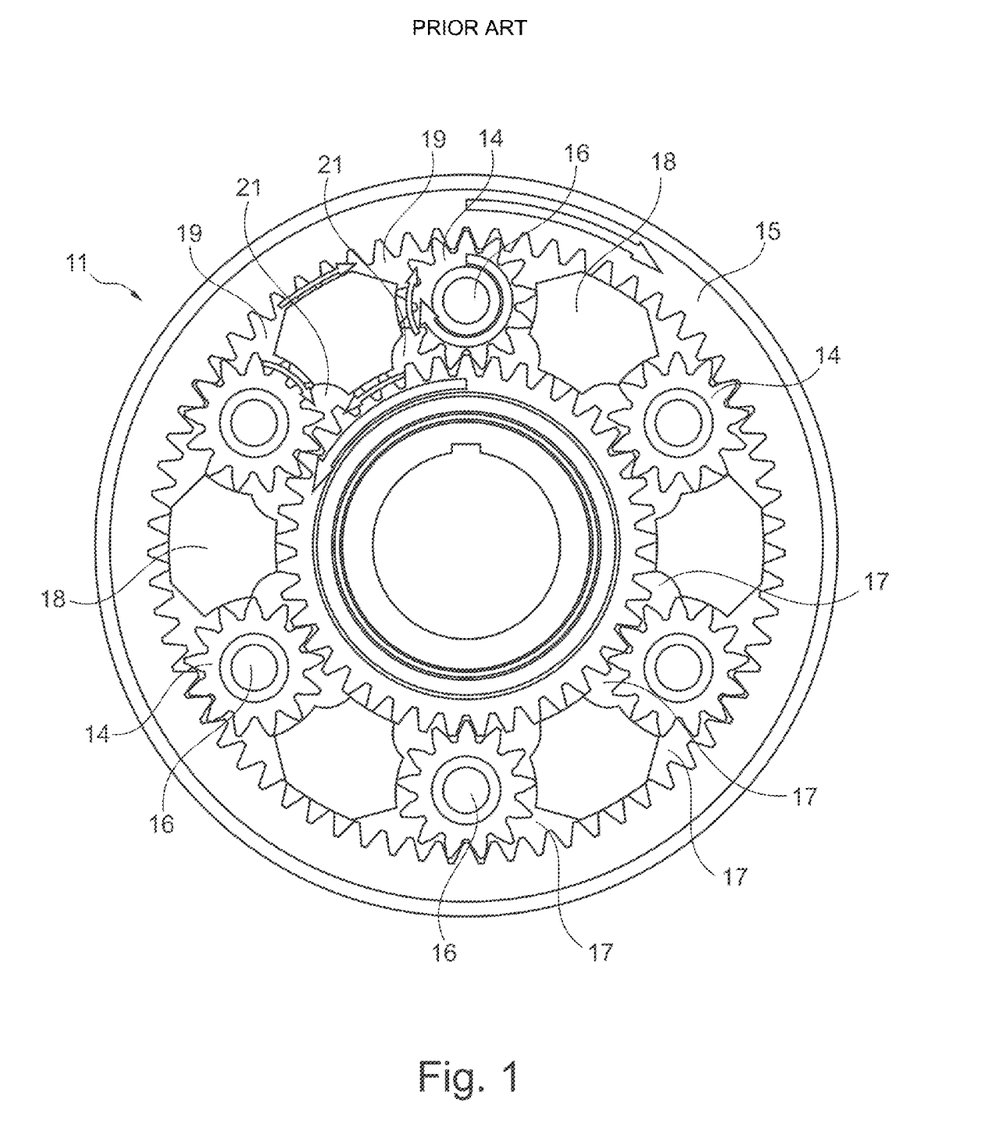
FIG. 1 illustrates a planetary wheel set, designed as a pump, for a transmission unit in accordance with the prior art.

In accordance with FIG. 1, a known transmission unit comprises a planetary wheel set 11, which is designed as a pump and is accommodated in a pump casing (not illustrated). The planetary wheel set 11 comprises a sun wheel 13, an arrangement of a plurality of planet wheels 14 and an annulus 15. The planet wheels 14 are mounted on a planet carrier 16, which is connected, for example, for conjoint rotation to a driving element (not illustrated) that rotates about an axis of rotation R. The annulus 15 can be connected for conjoint rotation to a driven element (likewise not illustrated) or can be formed integrally therewith. Respective arms 18 of the planet carrier 16 are arranged between each pair of adjacent planet wheels 14, the outer wall of said arms extending as far as the teeth of the sun wheel 13, of the annulus 15 and of the two corresponding planet wheels 14 to form a sealing gap. The remaining interspaces 17 in the planetary wheel set 11, which are situated outside the arm 18, are filled with a hydraulic fluid, e.g., oil.

When the planet wheels 14 roll on the sun wheel 13 and the annulus 15 owing to rotation of the planet carrier 16, the respective intermeshing teeth pump the hydraulic fluid from a respective suction zone 19 to a respective pressure zone 21. In order to operate the planetary wheel set 11 as a gearwheel pump, suction lines and discharge lines can be provided for the hydraulic fluid, these opening into the interspaces 17 and allowing the hydraulic fluid to be circulated between the suction zones 19 and the pressure zones 21. A controllable throttling device (not illustrated in FIG. 1) can be integrated into a hydraulic circuit formed in this way. By throttling the circulated fluid flow, the sun wheel 13, the annulus 15 and the planet carrier 16 can be braked relative to one another. In particular, it is possible, by completely shutting off the throttling device, to set the planetary wheel set 11 to rotate as a unit.

Figure 2:
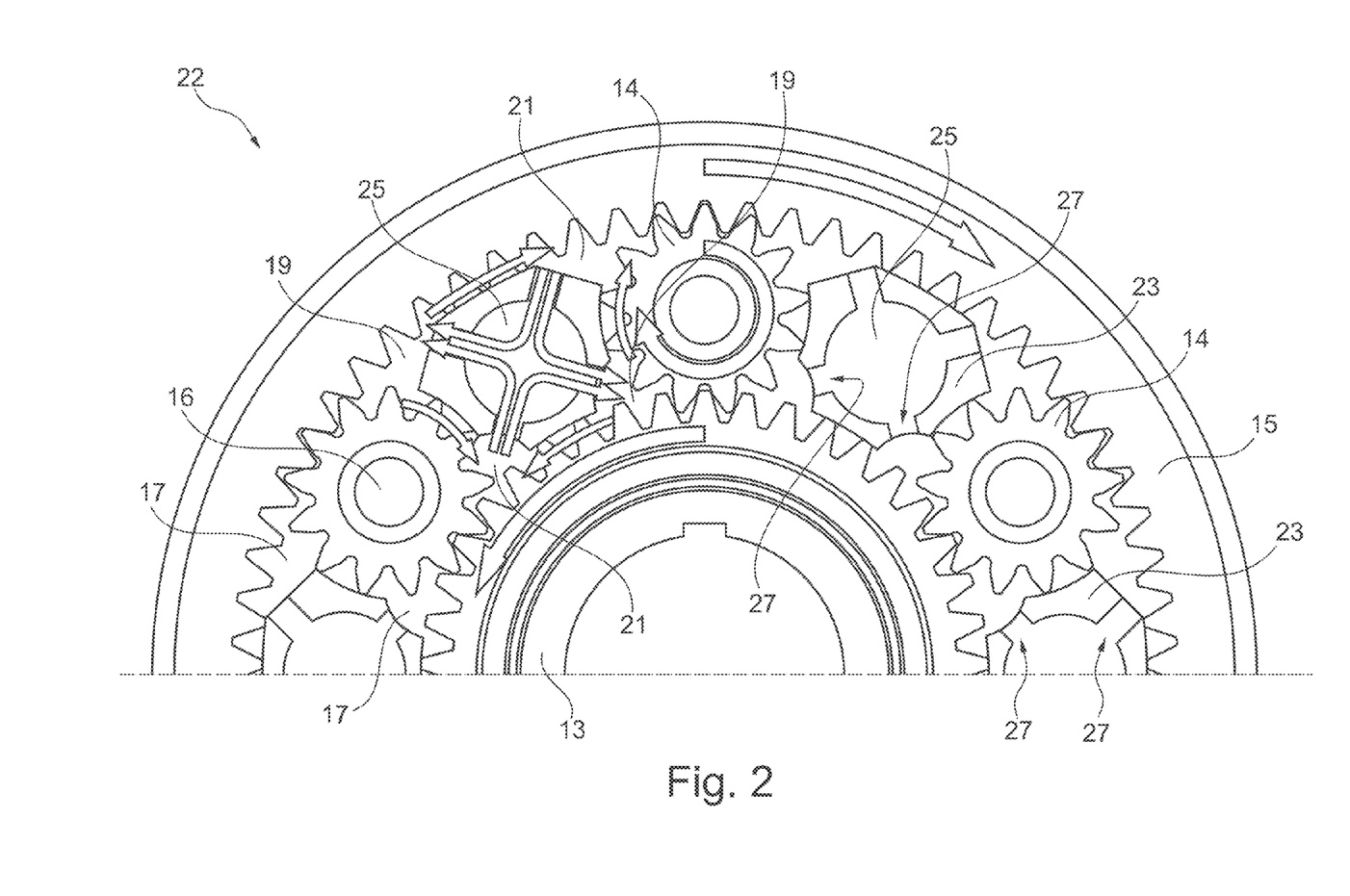
FIG. 2 illustrates a planetary wheel set, designed as a pump, for a transmission unit in accordance with one embodiment of the invention.

FIG. 2 illustrates a transmission unit in accordance with a first embodiment of the invention, which comprises a planetary wheel set 22, designed as a pump, similar to the planetary wheel set 11 in accordance with FIG. 1, with components that are the same or equivalent being denoted by the same reference signs. The arms 23 situated between the sun wheel 13, the annulus 15 and respective pairs of adjacent planet wheels 14 are of hollow design and therefore serve as fluid reservoirs 25. The fluid reservoirs 25 are each connected via openings 27 to two mutually opposite suction zones 19 and pressure zones 21, wherein the openings 27 act as throttling elements in accordance with the flow cross section thereof.

The throttling effect can be controlled by partially or fully shutting off one or more openings 27. When the openings 27 are exposed, as illustrated in FIG. 2, the hydraulic fluid pumped from the respective suction zones 19 into the respective pressure zones 21 by the meshing gearwheels of the planetary wheel set 22 passes back into the suction zones 19 through the fluid reservoir 25, that is to say, therefore, that the hydraulic fluid is being circulated and therefore the sun wheel 13, the annulus 15 and the planet carrier 16 are decoupled from one another in respect of rotation about the axis of rotation R, apart from the flow resistance. As compared with the arrangement illustrated in FIG. 1, however, the flow resistance is reduced since the hydraulic fluid can in each case pass from the respective pressure zone 21 to the respective suction zone 19 over the shortest possible distance. Moreover, the flow cross section, which is essentially given by the size of the openings 27, can be adapted as desired.

Figure 3:
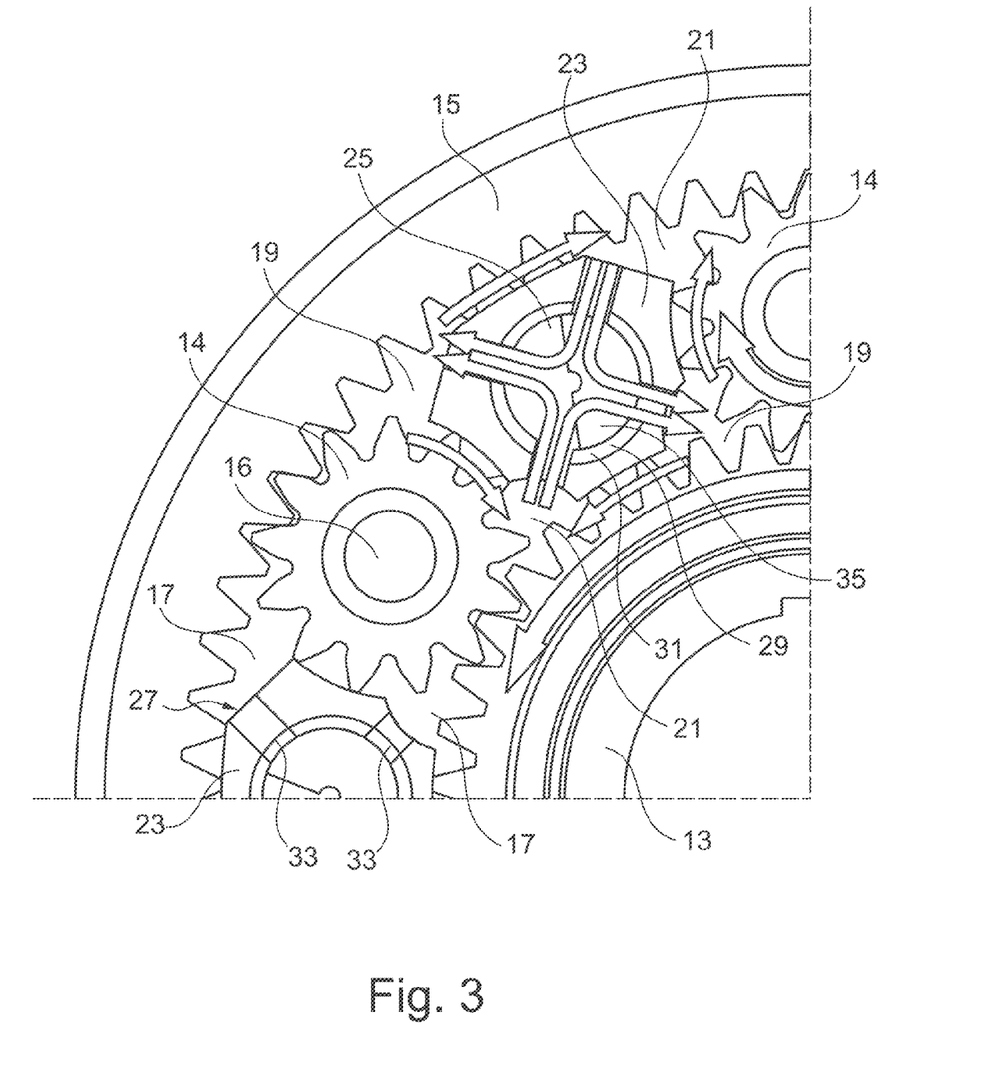
FIG. 3 illustrates a planetary wheel set, designed as a pump, with a valve that operates in a manner dependent on centrifugal force, for a transmission unit in accordance with one embodiment of the invention.
Figure 4:
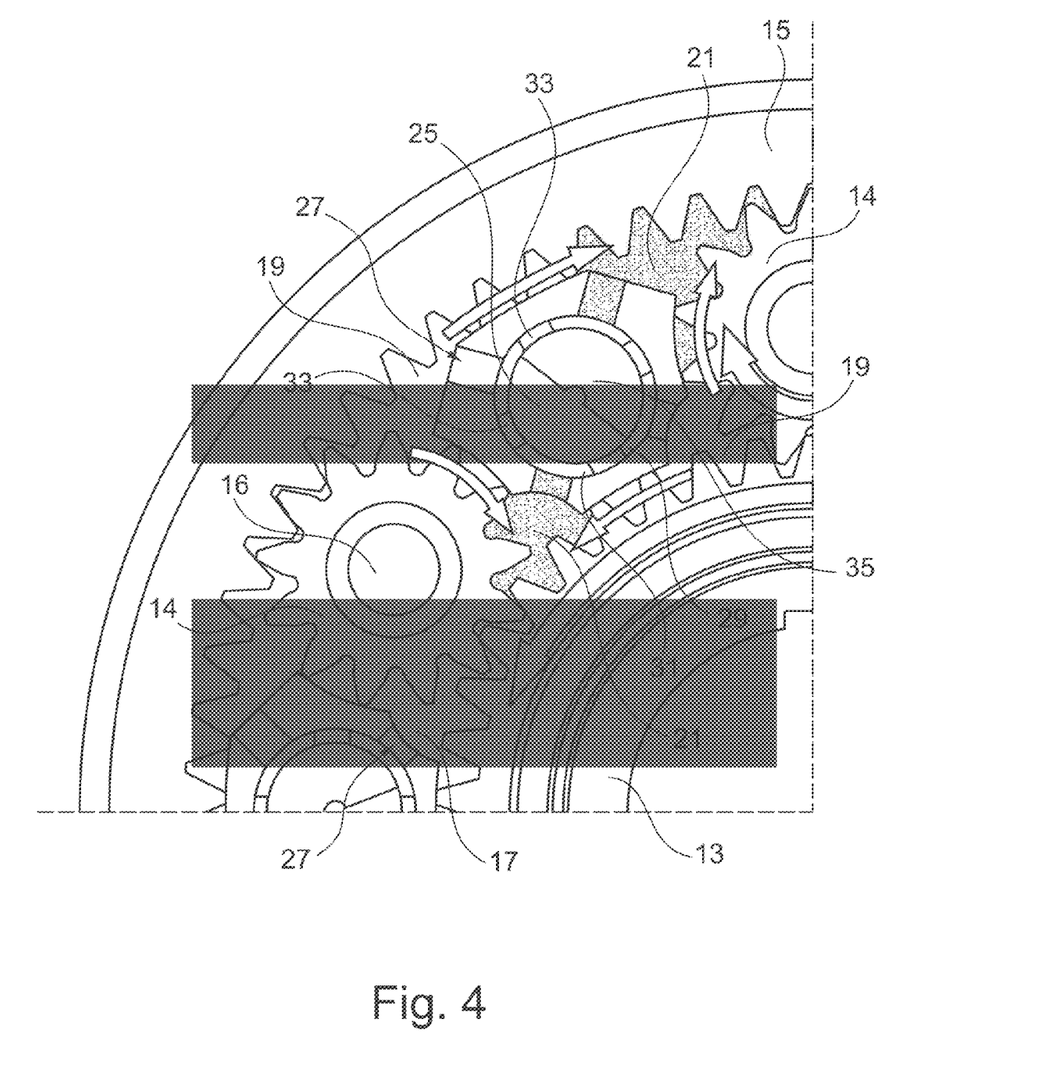
FIG. 4 illustrates the planetary wheel set in accordance with FIG. 3 in a locked state.

In accordance with another embodiment of the invention, a rotary slide valve 29 integrated into the fluid reservoir 25 can be provided as a throttling device, said valve being described in greater detail with reference to FIGS. 3 to 6. Each rotary slide valve 29 comprises a shutoff element 31, in this case a cylindrical shutoff element, which is mounted in the associated fluid reservoir 25 in such a way that it can rotate about a valve axis V parallel to the axis of rotation R of the planetary wheel set 22. The fluid reservoirs 25 thus form valve seats of the rotary slide valves 29. Each shutoff element 31 has passages 33 which, in an open position in accordance with FIG. 3, are in alignment with the openings 27 of the fluid reservoir 25 and thus allow a flow of fluid from the pressure zones 21 to the suction zones 19. By rotation about the valve axis V, the shutoff elements 31 can move into the shutoff position in accordance with FIG. 4, in which the passages 33 are not in alignment with the openings 27 of the fluid reservoir 25 and hence a flow of fluid from the pressure zones 21 to the suction zones 19 is blocked. Circulation of the hydraulic fluid is thus not possible, for which reason the sun wheel 13, the annulus 15 and the planet carrier 16 are braked relative to one another, that is to say the planetary wheel set 22 is set to rotate as a unit.

Figure 5:
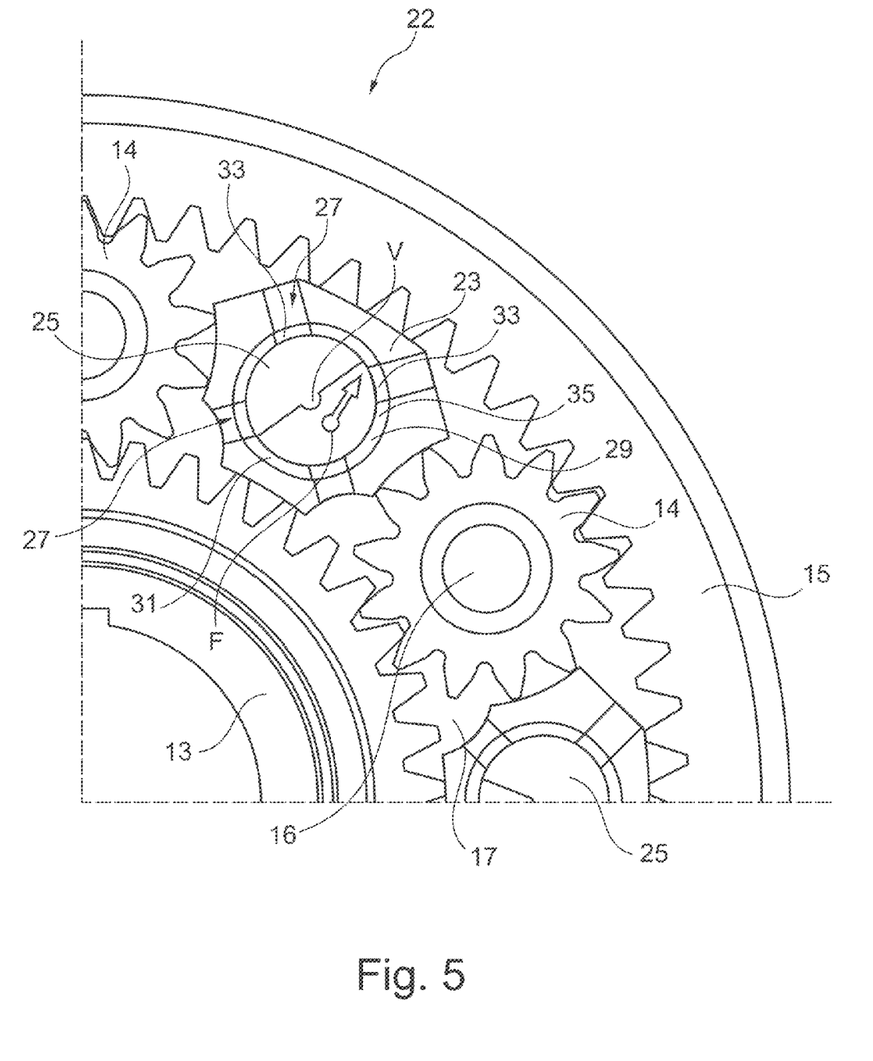
FIG. 5 illustrates a valve that operates in a manner dependent on centrifugal force and is integrated into the planetary wheel set in accordance with FIG. 4, in a first operating position.
Figure 6:
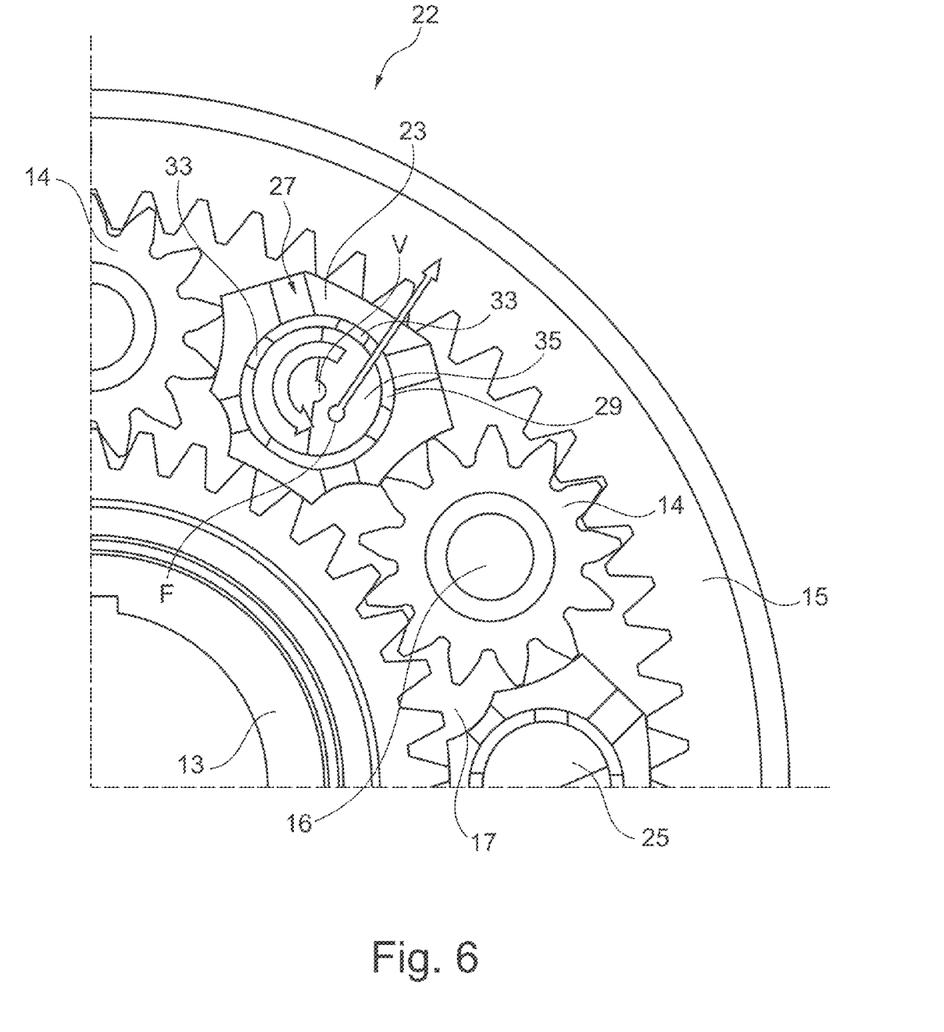
FIG. 6 illustrates the valve in accordance with FIG. 5 in a second operating position.

Respective eccentric masses 35 are provided on the shutoff elements 31, and these masses can provide a torque dependent on the centrifugal force in relation to the valve axis V. When the centrifugal force F is small, as illustrated in FIG. 5, because the planet carrier 16 is rotating at a low speed, the eccentric mass 35 is in a radially inner position, and the passages 33 in the shutoff element 31 are in alignment with the openings 27 in the fluid reservoir 25 in order to allow a flow of the fluid through the fluid reservoir 25. When the centrifugal force F is relatively large, as illustrated in FIG. 6, because the planet carrier 16 is rotating at a high speed, the eccentric mass 35 is moved by rotation into a radially outer position, in which the passages 33 in the shutoff element 31 are not in alignment with the openings 27 in the fluid reservoir 25, and a flow of fluid through the fluid reservoir 25 is consequently blocked. The rotary slide valves 29 thus operate in a manner dependent on the centrifugal force, with the result that separate activation is not required. To produce a correct initial position, the shutoff elements 31 are preloaded into the open position in accordance with FIG. 5 by a spring device (not illustrated in FIGS. 5 and 6).

Figure 7:
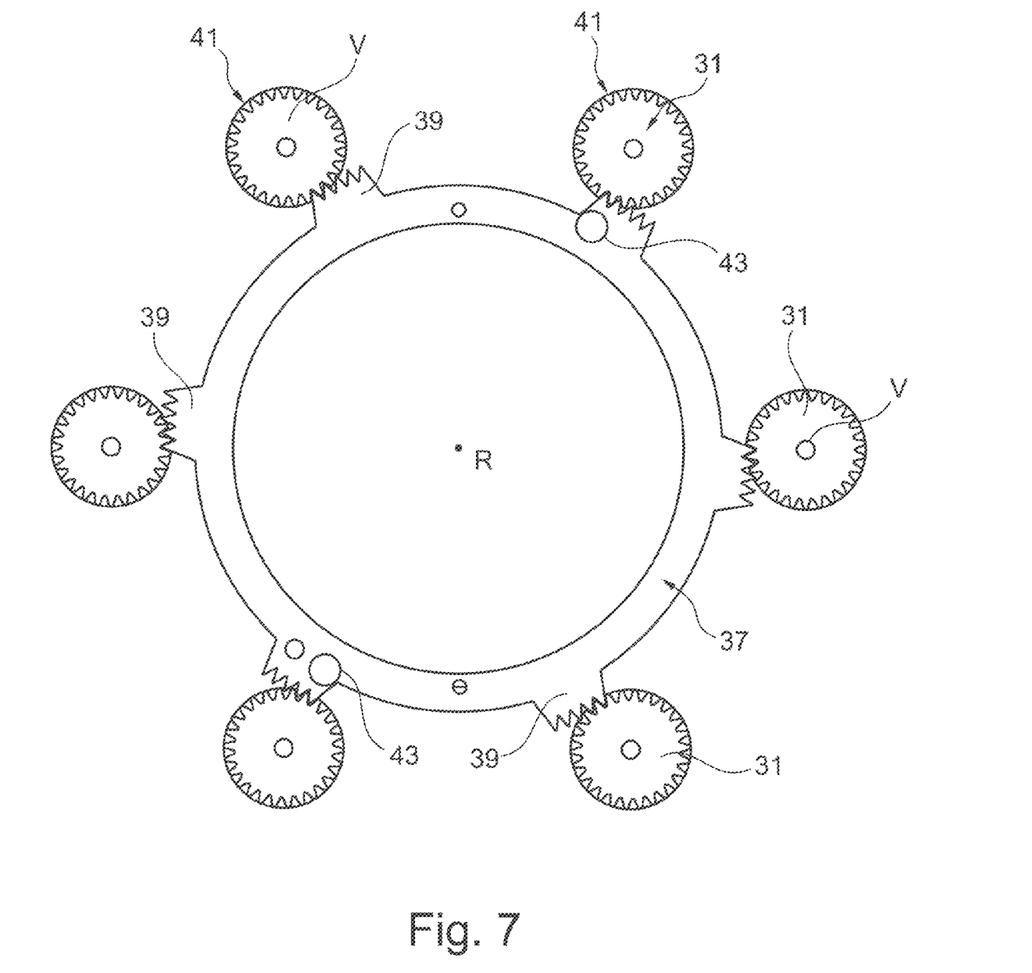
FIG. 7 illustrates a synchronizer ring for the joint actuation of a plurality of valves in a plan view.
Figure 8:
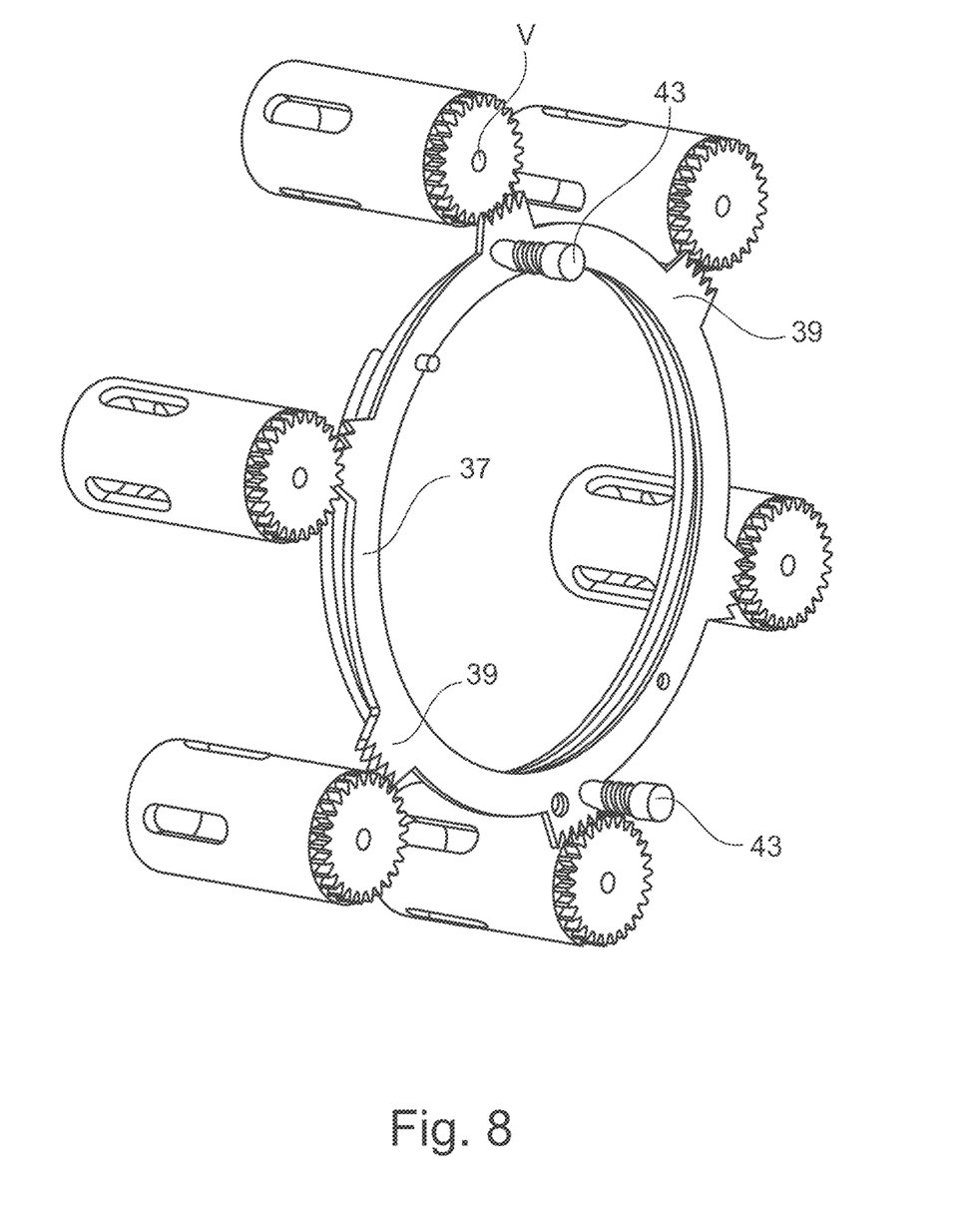
FIG. 8 illustrates the synchronizer ring in accordance with FIG. 7 and the valves to be actuated, in a perspective view.

In order to ensure a simultaneous switchover of all the rotary slide valves 29 of the planetary wheel set 22, a common synchronizer ring 37 designed as a punched sheet-metal part is provided, said ring having toothed radial projections 39 which are in engagement with external toothing 41 on each of the shutoff elements 31. By means of a spiral spring, the synchronizer ring 37 preloads all the shutoff elements 31 jointly into the open position. Also provided on the synchronizer ring 37 are latching elements 43, which latch the synchronizer ring 37 and hence all the shutoff elements 31 jointly either in the open position or in the shutoff position.

Figure 9:
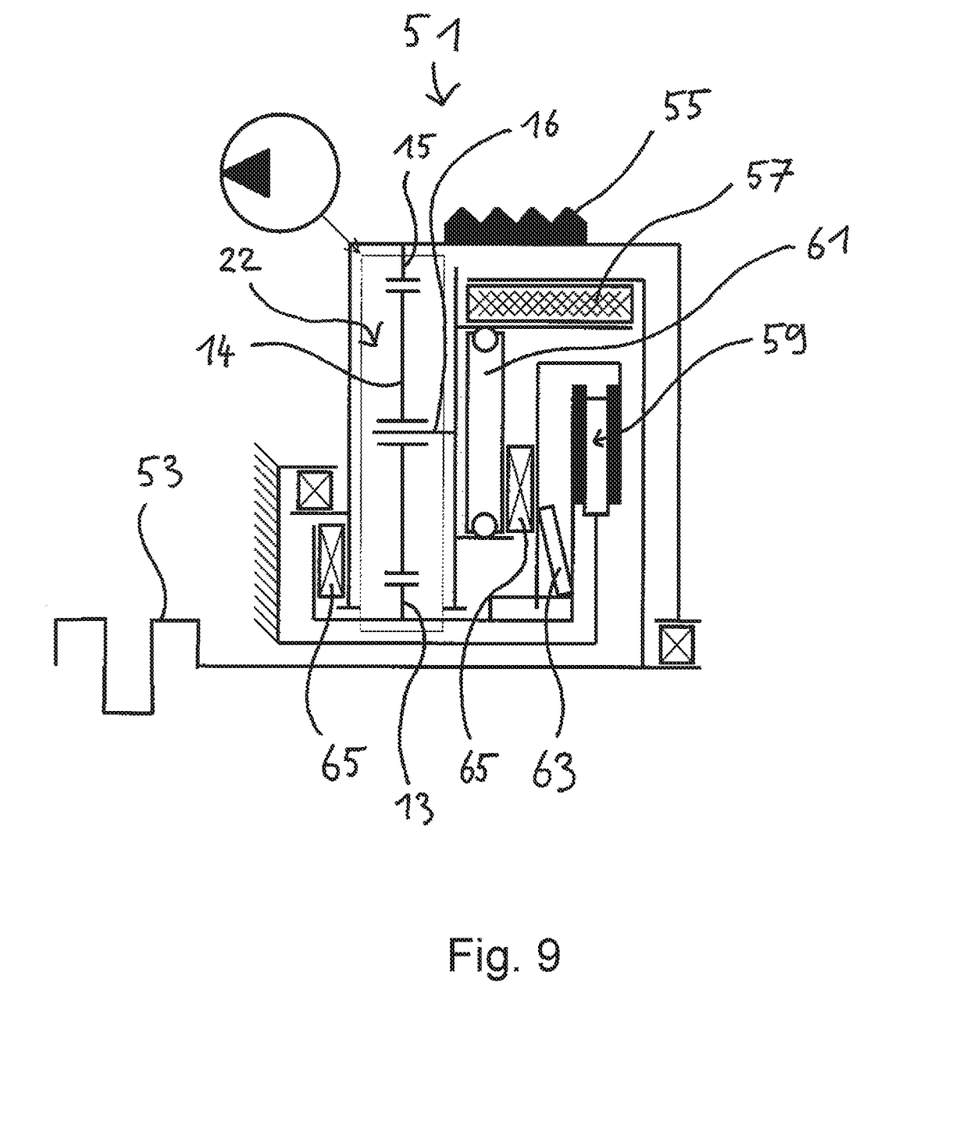
FIG. 9 is a schematic representation of a driving device for an auxiliary unit of an engine, which has a transmission unit in accordance with the invention, wherein the transmission unit is illustrated in a first operating position.

FIG. 9 illustrates a driving device 51 in accordance with one embodiment of the invention, which is secured on an internal combustion engine (not illustrated specifically) of a motor vehicle. The driving device 51 serves to transmit a torque output by the crankshaft 53 of the internal combustion engine to a belt pulley 55, over which a poly-V belt (not illustrated) runs in order to drive an auxiliary unit of the internal combustion engine, e.g. a power steering pump or an air-conditioning compressor. In order to adapt the speed of the belt pulley 55 and thus of the auxiliary-unit input shaft to be driven to different operating states of the internal combustion engine, the driving device 51 comprises a switchable transmission unit comprising a planetary wheel set 22 designed as a pump, as illustrated in FIGS. 3 to 6. The crankshaft 53 is connected for conjoint rotation to the planet carrier 16, whereas the annulus 15 is connected for conjoint rotation to the belt pulley 55. For decoupling of vibration, a flexible connecting element 57, preferably produced from rubber, is arranged between the planet carrier 16 and the crankshaft 53. A multi-disk brake 59 is used to selectively fix the sun wheel 13 of the planetary wheel set 22 relative to a housing of the internal combustion engine.

Figure 10:
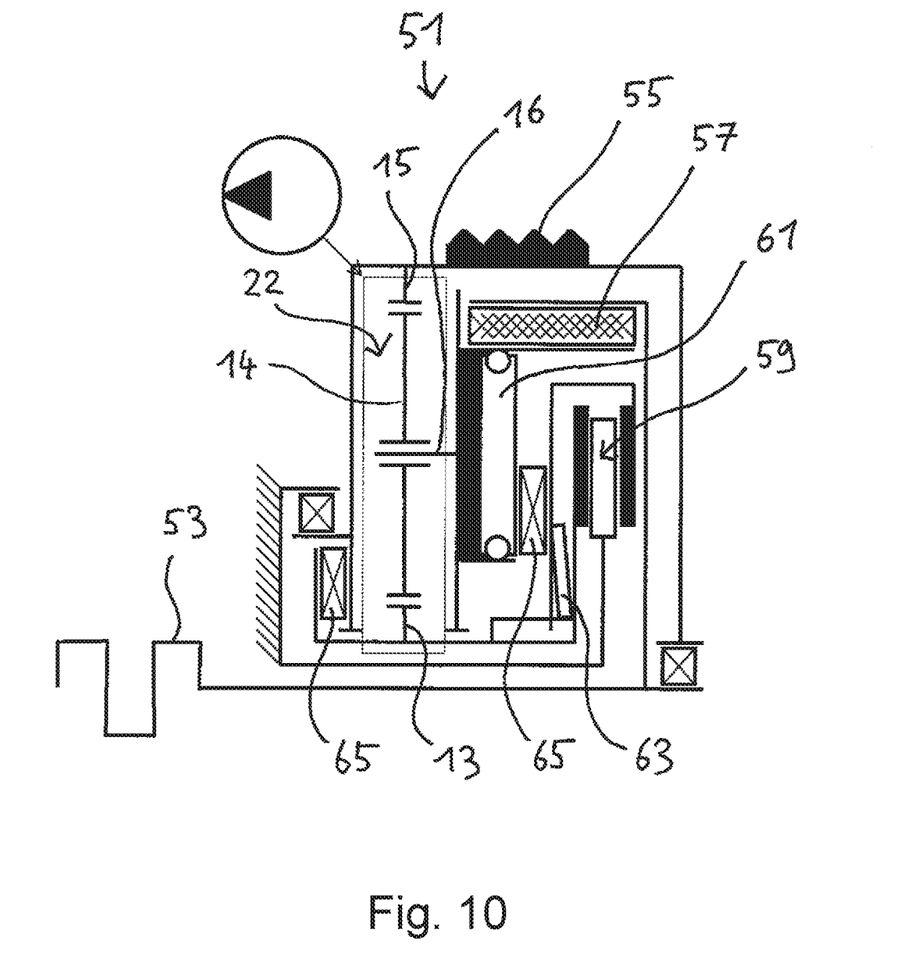
FIG. 10 illustrates the driving device in accordance with FIG. 9, wherein the transmission unit is illustrated in a second operating position.

To control the multi-disk brake 59, a hydraulic control piston 61 is provided, this being connected to the pressure zones 21. The multi-disk brake 59 is preloaded into the braking position by a spring 63. By applying pressure to the hydraulic control piston 61 from the pressure zones 21, the brake can be released, as illustrated in FIG. 10. In order to absorb the corresponding axial forces, axial bearings 65 are provided. Leaks at the axial boundaries of the interspaces 17 of the planetary wheel set 22 (FIGS. 2 to 6) can be reduced by pressure-dependent lateral gap reduction, i.e. in the case of a pressure buildup in the pressure zones 21 and at the control piston 61, the casing of the pump (planetary wheel set 22) is compressed fluid-tightly in the axial direction.

At a low engine speed, the sun wheel 13 is locked by the multi-disk brake 59, as illustrated in FIG. 9, and, via the planet carrier 16, the crankshaft 53 drives the planet wheels 14, which roll on the fixed sun wheel 13 and, for their part, drive the annulus 15, as a result of which the planetary wheel set 22 circulates hydraulic fluid. During this process, the rotary motion of the crankshaft 53 is stepped up. At a higher engine speed, the planet carrier 16 is coupled substantially for conjoint rotation to the sun wheel 13 by blockage of the delivery of fluid by means of the rotary slide valves 29 operating in a manner dependent on centrifugal force. At the same time, the sun wheel 13 is released by opening the multi-disk brake 59. The planetary wheel set 22 rotates as a unit and the speed is transmitted at a ratio of almost 1:1 (i.e. i=1) from the crankshaft 53 to the belt pulley 55.

To switch between the two transmission ratios, there is no need for any control lines since the multi-disk brake 59 is operated automatically and in synchronism with the rotary slide valves 29 by the load-dependent fluid pressure in the pressure zones 21. The higher of the two transmission ratios, which is used most frequently during normal engine operation, is distinguished by a particularly high efficiency since, on the one hand, circulation of the fluid is blocked and, on the other hand, the planetary wheel set 22 rotates as a unit, thereby minimizing frictional losses. The belt pulley 55 illustrated drives at least one further belt pulley (not illustrated) of the auxiliary unit concerned via the abovementioned poly-V belt, wherein different diameters of the two belt pulleys are used to define a further transmission ratio, which is superimposed on the switchable transmission ratio of the transmission unit. In this way, the speed of the crankshaft 53 can also be either stepped up or stepped down.

LIST OF REFERENCE SIGNS 11 planetary wheel set
13 sun wheel
14 planet wheel
15 annulus
16 planet carrier
17 interspace
18 arm
19 suction zone
21 pressure zone
22 planetary wheel set
23 arm
25 fluid reservoir
27 opening
29 rotary slide valve
31 shutoff element
33 passage
35 eccentric mass
37 synchronizer ring
38 spiral spring
39 toothed radial projection
41 external toothing
43 latching element
51 driving device
53 crankshaft
55 belt pulley
57 connecting element
59 multi-disk brake
61 hydraulic control piston
63 spring
65 axial bearing
R axis of rotation
V valve axis
F centrifugal force

What is claimed is:

1. A transmission unit, comprising:
a pump having a pump casing and a planetary wheel set in the pump casing, the planetary wheel set having a plurality of gearwheel elements, the pump being configured to deliver, via the gearwheel elements, a hydraulic fluid from a suction zone to a pressure zone of the pump casing;
a controllable throttling device between adjacent gearwheel elements and configured to selectively throttle fluid flow between the suction zone and the pressure zone and thereby to brake the gearwheel elements relative to one another, the throttling device including a valve moveable by centrifugal force, the valve including a rotatable shutoff element configured to be latched between a first end position and a second end position;
a fluid reservoir in the pump casing in spaces between adjacent gearwheel elements, and configured for simultaneous fluidic connection to the suction zone and to the pressure zone via the controllable throttling device; and
a synchronizer ring configured to couple the rotatable shutoff elements to one another.

2. The transmission unit of claim 1, wherein the throttling device is integrated into the fluid reservoir.

3. The transmission unit of claim 1, wherein the fluid reservoir is provided between a sun wheel, an annulus and adjacent planet wheels of the planetary wheel set.

4. The transmission unit of claim 1, wherein the fluid reservoir is integrated into a planet carrier of the planetary wheel set.

5. The transmission unit of claim 1, wherein respective fluid reservoirs are provided in spaces between adjacent planet wheels of the planetary wheel set.

6. The transmission unit of claim 1, wherein the rotatable shutoff element is mounted eccentrically in a valve body of the valve.

7. The transmission unit of claim 1, wherein the shutoff element is configured to be preloaded into an open position.

8. The transmission unit of claim 1, wherein the synchronizer ring is configured to preload each rotatable shutoff element jointly into an open position by via a spring device.

9. The transmission unit of claim 1, wherein the synchronizer ring comprises a punched sheet-metal.

10. The transmission unit of claim 9, wherein the synchronizer ring comprises teeth configured to interact with corresponding teeth of the shutoff element.

11. A transmission unit, comprising:
- a pump having a pump casing with a suction zone and a pressure zone, and a plurality of gearwheel elements spaced apart in the pump casing, the pump being configured to deliver, via the gearwheel elements, a fluid from the suction zone to the pressure zone;
- a throttling device in the space between adjacent gearwheel elements and configured to selectively throttle fluid flow between the suction zone and the pressure zone and thereby to brake the gearwheel elements relative to one another, the throttling device including a valve moveable by centrifugal force, the valve including a moveable shutoff element configured to be latched between a first end position and a second end position;
- a fluid reservoir in the space between adjacent gearwheel elements, and configured for simultaneous fluidic connection to the suction zone and to the pressure zone via the throttling device; and
- a synchronizer ring configured to couple the moveable shutoff elements to one another, wherein the synchronizer ring is configured to preload each moveable shutoff element jointly into an open position via a spring device and comprises teeth configured to interact with corresponding teeth of the moveable shutoff element.

12. The transmission unit of claim 11, wherein the moveable shutoff element is mounted eccentrically in a valve body of the valve.

13. A driving device for an auxiliary unit of an engine, the driving device comprising:
- an output element having a shaft;
- an input element having a belt pulley;
- a transmission unit configured to adapt the speed of the shaft relative to the belt pulley, the transmission unit including:
  - a pump having a pump casing with a suction zone and a pressure zone, and a plurality of gearwheel elements spaced apart in the pump casing, the pump being configured to deliver, via the gearwheel elements, a fluid from the suction zone to the pressure zone;
  - a throttling device in the space between adjacent gearwheel elements and configured to selectively throttle fluid flow between the suction zone and the pressure zone and thereby to brake the gearwheel elements relative to one another, the throttling device including a valve moveable by centrifugal force, the valve including a moveable shutoff element configured to be latched between a first end position and a second end position;
  - a synchronizer ring configured to couple the moveable shutoff elements to one another, wherein the synchronizer ring is configured to preload each moveable shutoff element jointly into an open position via a spring device and comprises teeth configured to interact with corresponding teeth of the moveable shutoff element;
  - a fluid reservoir in the space between adjacent gearwheel elements, and configured for simultaneous fluidic connection to the suction zone and to the pressure zone via the throttling device; and
  - a controllable brake configured to selectively fix one of the gearwheel elements,
- wherein the transmission unit is configured for operation between a first operating state in which a transmission ratio between the shaft and the belt pulley is set by actuating the throttling device, and second operating state in which a transmission ratio unequal to one between the shaft and the belt pulley is set by actuating the brake.

14. The driving device of claim 13, wherein the pressure zone is connected to a control piston for hydraulic actuation of the brake.

* * * * *